United States Patent [19]

Hirayama

[11] Patent Number: 4,841,847
[45] Date of Patent: Jun. 27, 1989

[54] AIR CLEANING APPARATUS AND CONSTRUCTION OF CLEAN ROOM WITH THE SAME

[76] Inventor: Shoji Hirayama, No. 3-12-14, Chuorinkan, Yamato-Shi, Kanagawa-Ken, Japan

[21] Appl. No.: 132,670

[22] Filed: Dec. 10, 1987

Related U.S. Application Data

[63] Continuation of Ser. No. 867,623, May 27, 1986, abandoned, which is a continuation of Ser. No. 778,730, Sep. 20, 1985, abandoned, which is a continuation of Ser. No. 506,541, Jun. 21, 1983, abandoned.

[51] Int. Cl.⁴ .................................................. F24F 7/00
[52] U.S. Cl. ..................................... 98/31.5; 98/31.6; 55/385.1
[58] Field of Search ........................ 98/31.5, 31.6, 33.1, 98/34.5, 34.6, 40.1, 40.19, 36, 115.3; 55/385 A, 413, 414, DIG. 18, DIG. 29

[56] References Cited

U.S. PATENT DOCUMENTS

| | | | |
|---|---|---|---|
| 1,518,162 | 12/1924 | Parkinson | 98/33 R |
| 1,592,718 | 7/1926 | Browne | 98/33 A |
| 2,239,508 | 4/1941 | Sipp et al. | 55/DIG. 29 |
| 2,547,448 | 4/1951 | Demuth | 98/33 A |
| 2,863,606 | 12/1958 | Tatsch | 98/33 A |
| 3,122,087 | 2/1964 | Demuth et al. | 55/DIG. 29 |
| 3,251,177 | 5/1966 | Baker | 98/115 LH |
| 3,462,920 | 8/1969 | Denny | 55/413 |
| 3,719,136 | 3/1973 | Criddle | 55/DIG. 29 |
| 4,079,665 | 3/1978 | Martin | 98/33 A |
| 4,409,889 | 10/1983 | Burleson | 98/31.5 |
| 4,531,956 | 7/1985 | Howorth | 98/36 |
| 4,592,210 | 6/1986 | Hirayama | 62/288 |

FOREIGN PATENT DOCUMENTS

| | | | |
|---|---|---|---|
| 2275734 | 1/1976 | France | 98/33 A |
| 2374595 | 7/1978 | France | 98/33 A |
| 379728 | 8/1964 | Switzerland | 98/40 C |

OTHER PUBLICATIONS

PCT WO85/04240 Mar. 1985 inventor: Foster.

Primary Examiner—Robert E. Garrett
Assistant Examiner—John T. Kwon
Attorney, Agent, or Firm—Parkhurst & Oliff

[57] ABSTRACT

An air cleaning apparatus for a dust-free and sterile clean room necessary for an industry has a columnar body of predetermined shape having at least an air suction port and an air circulating blower, and at least a duct horizontally extending along the lower surface of a ceiling in a predetermined shape in cross section above the body. The duct has one or more clean air diffuser exits formed in a room to be cleaned for diffusing clean air into the room. This apparatus also has an air cleaning dust collector arranged between the blower and the air diffuser exits. Thus, clean air can be diffused into the room to be cleaned simply and rapidly entirely regardless of the size and the shape of the room and an already-built building. The clean room is quickly and economically constructed using the air cleaning apparatus.

16 Claims, 5 Drawing Sheets

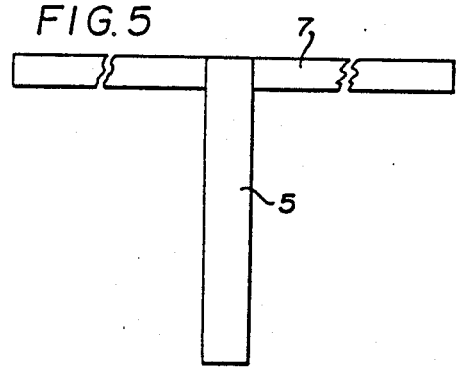
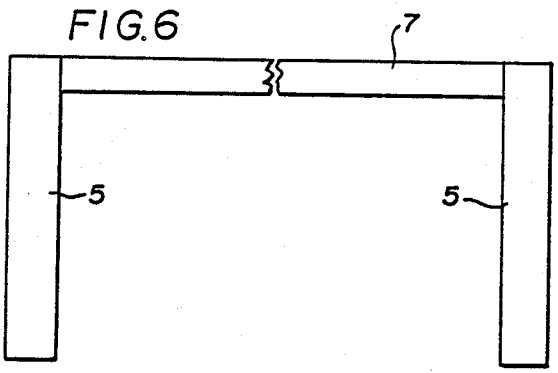
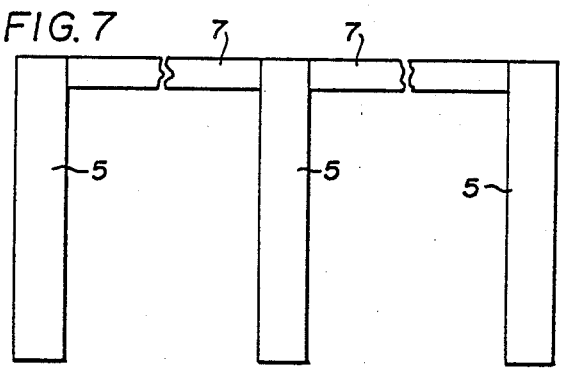

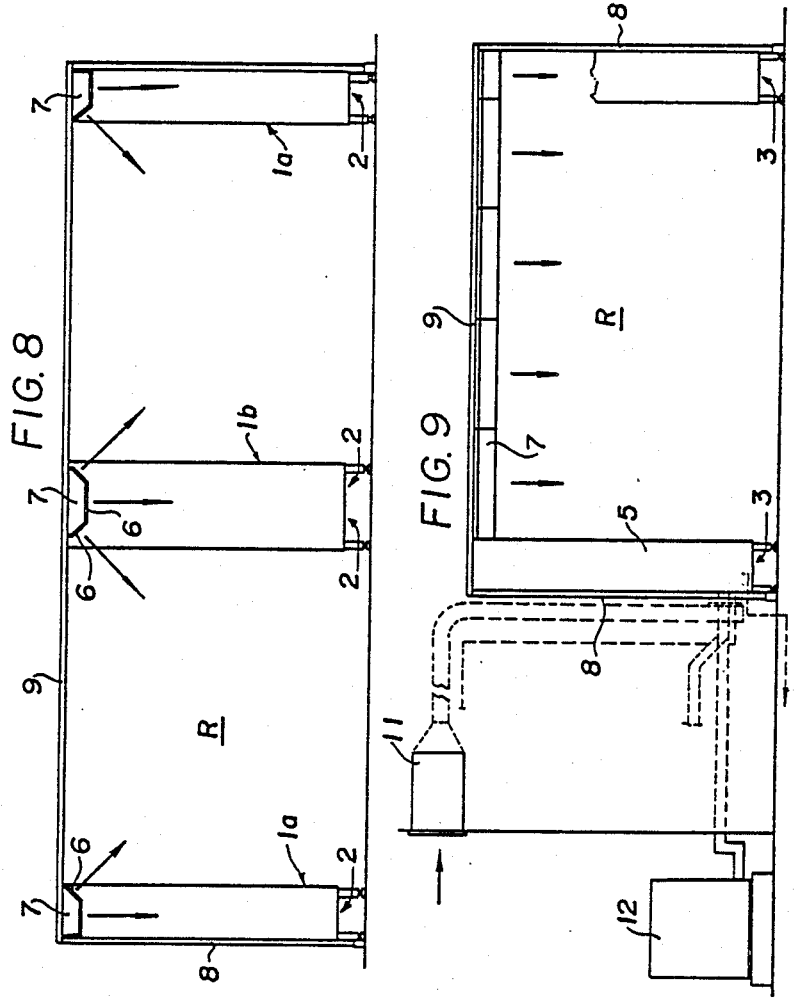

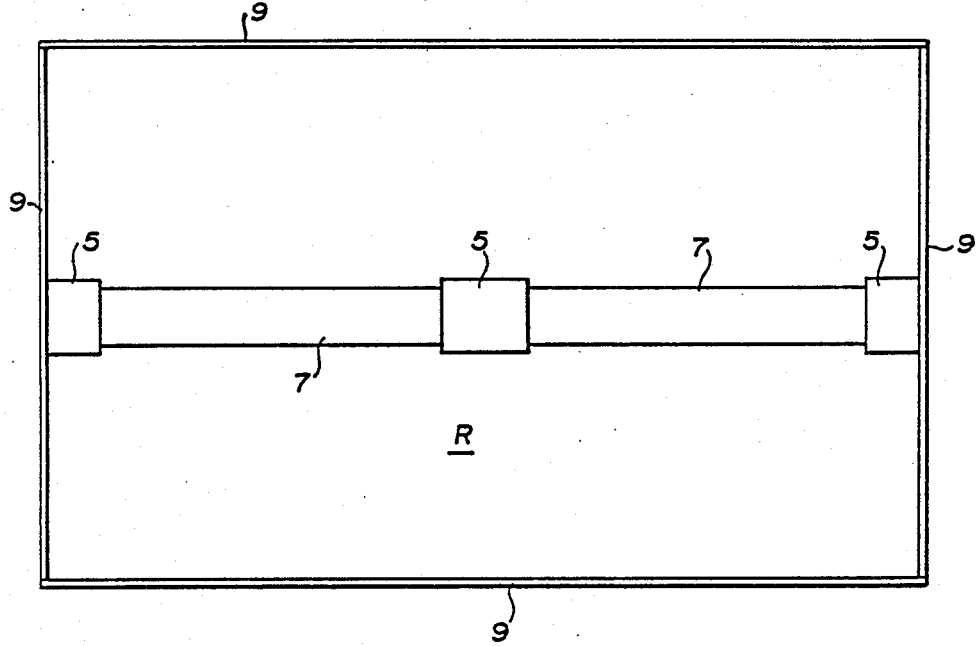

AIR CLEANING APPARATUS AND CONSTRUCTION OF CLEAN ROOM WITH THE SAME

This is a continuation of application Ser. No. 867,623 filed May 27, 1986 which in turn is a continuation of application Ser. No. 778,730 filed Sept. 20, 1985, which is continuation of 06/506,541 filed June 21, 1983 now abandoned.

BACKGROUND OF THE INVENTION

This invention relates to an air cleaning apparatus for a dust-free and sterile clean room necessary for general industrial, food industrial and dangerous article handling fields as well as the construction of a clean room with the air cleaning apparatus.

Heretofore, there is an air cleaning apparatus for a clean room, having an air diffuser exit and an air suction port respectively provided at upper and lower ends, an air circulation blower, air cleaning filter and/or an air conditioner as required. This conventional apparatus is disposed at a suitable position in the room to clean the air in the room. According to the structure of the apparatus, the area of the clean air diffuser exit is small and hence the circulation of the clean air is insufficient in the apparatus. Thus, it is not sufficient to clean the air in the room and is difficult to obtain a sufficiently clean room.

Further, in the construction of the conventional air cleaning apparatus in a clean room, an air duct is arranged in a ceiling or in the wall, an air diffuser port is formed on the ceiling or on the surface of a wall, and the clean air from the air cleaning apparatus is fed through the duct and the air diffuser port into the room to be cleaned. In this arrangement, the area of the clean air diffuser port is sufficiently constructed, but it is necessary to arrange the duct in the ceiling or in the wall. In addition, it is also necessary to form the clean air diffuser port on the surface of the ceiling or on the surface of the wall. Accordingly, the construction of the air cleaning apparatus in the clean room is complicated. Particularly, when the clean room is provided in the building already built, the ceiling and the wall of the building must be broken to arrange the duct and to form the clean air diffuser port. Therefore, the term of the construction becomes long and expensive.

SUMMARY OF THE INVENTION

Accordingly, an object of the present invention is to provide an air cleaning apparatus which can form an air clean room simply and rapidly entirely regardless of the size and the shape of a room to be cleaned and which can be easily installed in an existing building.

Another object of the present invention is to provide an air cleaning apparatus which can facilitate the inspection and the maintenance after installation thereof.

Still another object of the present invention is to provide an air cleaning apparatus which can accommodate a sufficiently large clean air diffuser port to provide sufficient clean air.

Still another object of the invention is to provide a construction process utilizing the air cleaning apparatus which enables simple construction of a clean room even in an already-built building, thereby largely reducing the time and expenses of construction.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIGS. 5 to 7 are views showing other preferred embodiments of the air cleaning apparatus of the invention wherein FIG. 5 shows a T-shaped arrangement, FIG. 6 shows an inverted U-shaped arrangement, and FIG. 7 shows an inverted E-shaped arrangement;

FIGS. 8 to 10 are explanatory views of the construction of the air cleaning apparatus of the invention wherein FIG. 8 shows a schematic sectional view of the clean room arranged with the air cleaning apparatus of the invention, FIG. 9 shows a side view of the clean room, and FIG. 10 shows a plan view of the clean room and FIGS. 11 and 12 are schematic plan views of the preferred examples of the clean room installed with the air cleaning apparatus of the invention.

DESCRIPTION OF THE PREFERRED EMBODIMENTS

The present invention will now be described in more detail with reference to the accompanying drawings.

Figure 1:
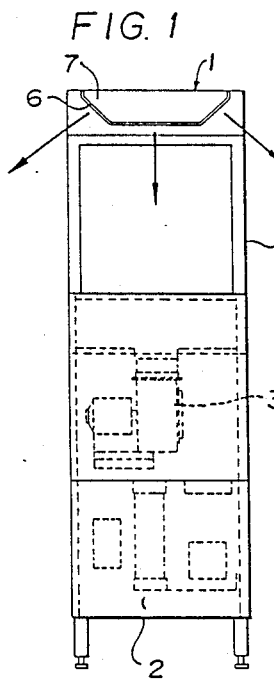
FIG. 1 is a front view of a preferred embodiment of an air cleaning apparatus for a clean room constructed according to the present invention.
Figure 2:
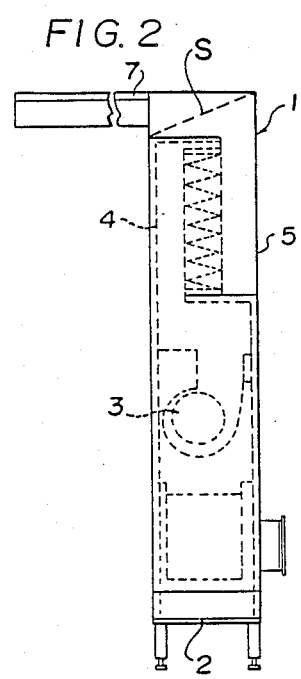
FIG. 2 is a side view of the apparatus in FIG. 1.

In FIGS. 1 and 2, the air cleaning apparatus 1 of one preferred embodiment of the present invention comprises and air suction port 2 formed at the bottom, a blower 3 provided above the suction port 2 for circulating the air, a columnar body 5, an air cleaning filter 4 installed as a duct collector above the blower 3 in the body 5, and an air duct 7 having clean air diffuser exit 6 formed at the side and lower surfaces of the body 5 and horizontally extending perpendicularly from the end of the body 5.

Figure 3:
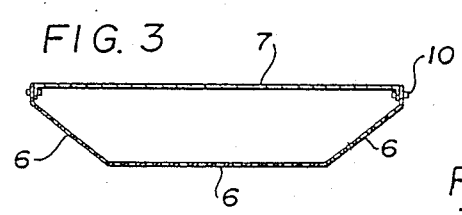
FIG. 3 is a sectional view showing an example of an air duct of the apparatus.
Figure 4:
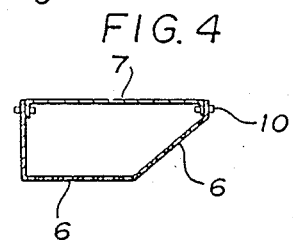
FIG. 4 is a sectional view of another example of the duct.

As shown in FIGS. 3 and 4, the duct 7 is formed in an inverted trapezoidal shape in cross section cut at both sides in a tapered shape, or in an inverted trapezoidal shape in cross section cut at one side in a tapered shape. The shape of the duct 7 in cross section depends upon the arrangement of the air cleaning apparatus 1 in the clean room.

The diffuser exits 6 are formed substantially over the entire surfaces of the side and lower faces of the duct 7 thereby sufficiently diffusing the clean air fed from the diffuser exits 6.

More particularly, the diffuser exits 6 are formed with porous plates at the side and lower faces of the duct 7. The duct 7 is clamped at the sides and lower part with screws 10 or hinge in a removable or openable structure, thereby facilitating the inspection and maintenance in the duct.

In the embodiment described above, the air cleaning filter 4 is installed in the body 5 above the blower 3. However, it is not limited only to this arrangement. For example, the filter 4 may also be arranged in the vicinity of the inlet of the end of the duct 7 or in the vicinity of the air diffuser exits 6.

The air cleaning apparatus 1 which is composed of the columnar body 5 and the duct 7 can be constructed in various shapes such as an inverted L shape in which the duct 7 extends in one side direction from the body 5 as shown in FIG. 1, a T shape in which the duct 7 extends at both sides as shown in FIG. 5, an inverted U shape in which the duct 7 extends in suspension between two columnar bodies as shown in FIG. 6, or an inverted E shape in which the duct 7 extends in suspension between three columnar bodies as shown in FIG. 7. The shape of the apparatus 1 may be adequately selected depending upon the shape and the size of the room to be cleaned.

Since food industry clean rooms must have dust-free and sterile clean air, it is preferred to provide a sterilizer 5 (FIG. 2) or a pasteurizer after the filter 4 or in the vicinity of the duct 7. Further, one may also install an air conditioner in the body 5 as required.

The operation for cleaning the room to be cleaned of the air cleaning apparatus constructed according to the present invention as described above will now be described.

The air in the room to be cleaned is sucked by the blower 3 from the air suction port 2 into the body 5, and then fed through the filter 4 where dust is removed from the air. Where a sterilizer or pasteurizer is provided, the air is subsequently passed through the sterilizer or pasteurizer to be pasteurized. The clean air thus treated is then fed into the duct 7 from the air cleaning apparatus 1. The clean air with dust and bacteria removed is fed through the diffuser exits 6 into the room to be cleaned.

The air thus fed into the room to be cleaned is again sucked into the body 5 and recirculated in the air cleaning apparatus 1 in the same manner as described above. Thus the air in the room is continuously cleaned.

The construction of the clean room with the air cleaning apparatus according to the present invention will now be described.

Figure 10:
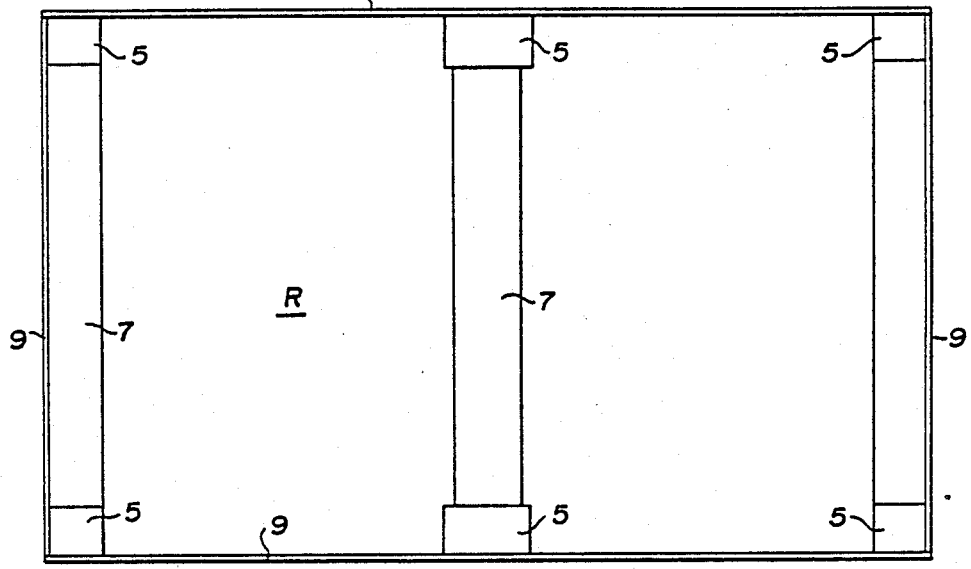

FIGS. 8, 9 and 10 show preferred embodiments of the construction of the air cleaning apparatus 1 of the inverted U shape shown in FIG. 6 in the room to be cleaned. The apparatuses 1 are respectively arranged at four corners and at the center side of a room R.

The bodies 5 of the respective apparatuses 1 are clamped to the wall surfaces 8 by simple means such as bolts and nuts. The ducts 7 extends along the lower surface of a ceiling 9. The air cleaning apparatuses 1 are designed in advance so that the size of the body 5 and the ducts 7 are adapted for the height of the ceiling 9 and the size of the room R.

In the embodiments described above, the air cleaning apparatus 1a arranged at four corners of the room is of the type having the section of the duct 7 in the inverted trapezoidal shape with a tapered side shown in FIG. 4. The air cleaning apparatus 1b arranged at the center side is of the type having the section of the duct 7 in the inverted trapezoidal shape with tapered sides at both sides shown in FIG. 3. In this manner, clean air can be diffused sufficiently to the entire room R from the respective apparatuses 1.

Figure 11:
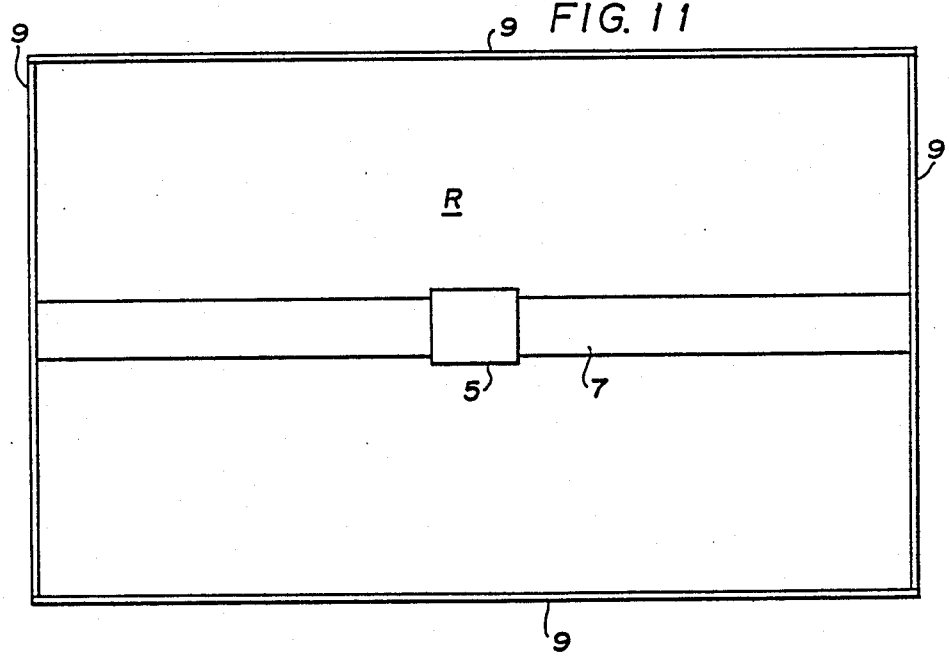

The air cleaning apparatuses shown in FIGS. 5 and 7 may be used at the center of the room R as shown in FIGS. 11 and 12. In this case, the duct 7 of the type having the inverted trapozoidal shape with tapered sides at both sides may be employed to effectively clean the air in the room to be cleaned.

If outer atmospheric air is introduced into the room to be cleaned as shown in FIG. 9, an outer atmospheric air treating unit 11 may be externally installed via a water supply pipe through the wall to the body 5 of the air cleaning apparatus 1. Furthermore, if an air conditioner is installed in the body of the air cleaning apparatus, a conditioned air pipe 12 may be similarly provided to the outer atmospheric air treating unit.

As described above, the air cleaning apparatus is constructed by undergoing the steps of installing the air cleaning apparatus by extending the duct along the body and the surface of the ceiling, and clamping an air cleaning apparatus of a type having a shape and size adapted for the room to be cleaned on the wall surface or on the floor surface.

It should be understood from the foregoing description that since the air cleaning apparatus of the present invention is constructed of the air cleaning apparatus in the room to be cleaned according to the present invention, so arranged that the area of the clean air diffuser exits can be sufficiently increased by providing ducts extending on the lower surface of the ceiling at the body and forming the clean air diffuser exits at ducts, thereby completely cleaning the air in the room to be cleaned can be achieved. The clean room can be simply formed by simply clamping the air cleaning apparatus with bolts and nuts in the room to be cleaned or securing the apparatus on the wall surface or on the floor surface, so that it is not necessary to arrange the ducts in the ceiling or in the wall as with conventional apparatus. The clean room can be simply formed regardless of the shape and the size of the room to be cleaned, even in existing buildings. The term of the construction and the expenses of the construction of the clean room with the air cleaning apparatus can be largely reduced, and the inspection and the maintenance of the air cleaning apparatus can be facilitated due to the installation of the air cleaning apparatus in the room to be cleaned.

What is claimed is:

1. An air cleaning apparatus for cleaning air in a room defined by a floor, ceiling and two pairs of opposing side walls, said apparatus comprising:

a columnar body extending between the floor and ceiling and arranged in contact with a first side wall of the room, said columnar body defining an elongated vertical duct having an air outlet arranged adjacent the ceiling and an air inlet port spaced from and facing the floor of the room;

an air circulating blower means in the columnar body for drawing air into said air inlet port and directing air toward said air outlet;

a horizontal duct fluidly communicating with the air outlet of said vertical duct, said horizontal duct extending completely across said room between a first pair of opposing side walls, said horizontal duct being defined by an upper face contacting said ceiling, a lower face spaced from and below said upper face, and two side faces each extending between said upper and lower faces, said lower face and at least one side face having clean air diffuser exits formed substantially over the entire surface of said at least one side face and lower face, for the entire length thereof to uniformly diffuse clean air across the room; and an air cleaning dust collector arranged between said blower means and said diffuser exits.

2. The apparatus of claim 1 wherein said horizontal duct has an inverted trapezoidal cross-sectional shape with the two side faces being inclined between said upper and lower faces, said two side faces each having clean air diffuser exits formed substantially over their entire surfaces for the entire length thereof.

3. The apparatus of claim 1, wherein said horizontal duct has an inverted trapezoidal cross-sectional shape with one side face being inclined between said upper and lower faces and the other side face vertically extending between said upper and lower faces, said inclined side face having said clean air diffuser exits formed on its entire surface for the entire length thereof, the vertical side face contacting a second side wall of said room.

4. The apparatus of claim 1, wherein the horizontal duct is connected to said columnar body to form an inverted L-shaped structure, the outlet of said vertical duct communicating with an end of said horizontal duct adjacent to one side wall of said room, an opposite end of said duct being located adjacent a side wall opposite to said one side wall.

5. The apparatus of claim 4, further comprising a second columnar body connected to the opposite end of said duct to form an inverted U-shaped structure.

6. The apparatus of claim 1, wherein the horizontal duct includes a central portion fluidly communicating with said air outlet of said vertical duct to form a T-shaped structure, opposite ends of said horizontal duct being located adjacent the opposing side walls of said first pair of opposing side walls.

7. The apparatus of claim 6, wherein said columnar body is a central columnar body and further comprising first and second columnar bodies each located at an opposite end of the horizontal duct.

8. The apparatus of claim 1, wherein a sterilizer is located between said dust collector and said air diffuser exits.

9. The apparatus of claim 1, wherein the side and lower faces of the horizontal duct are detachable from the upper face of the horizontal duct.

10. The apparatus of claim 1, wherein one side face of the horizontal duct is hinged to one edge of the upper face and the other side face of the horizontal duct is detachably secured to the opposite edge of the upper face.

11. An air cleaning apparatus for cleaning air in a room defined by a floor, ceiling and two pairs of opposing side walls, said apparatus comprising:
a first columnar body extending between the floor and ceiling and arranged in contact with a first side wall of the room, a second columnar body extending between the floor and ceiling and arranged in contact with a second side wall of the room opposite to said first side wall, each of said columnar bodies defining an elongated vertical duct having an upper air outlet arranged adjacent the ceiling and a lower air inlet port;
an air circulating blower means in each of said columnar bodies for drawing air into said air inlet port and directing air toward said air outlet;
a horizontal duct having a first end communicating with the air outlet of the vertical duct in the first columnar body and a second end communicating with the air outlet of the vertical duct of the second columnar body, said horizontal duct extending completely across said room between said first and second side walls, said horizontal duct being defined by an upper face contacting said ceiling, a lower face spaced from and below said upper face, and two side faces each extending between said upper and lower faces, said lower face and at least one side face having clean air diffuser exits formed substantially over the entire surface of said at least one face and lower face for the entire length thereof, to uniformly diffuse clean air across the room; and
an air cleaning dust collector arranged between said blower means of each columnar body and said diffuser exits of said horizontal duct.

12. The apparatus of claim 11, wherein the air inlet port of each columnar body is spaced from and faces the floor.

13. An air cleaning apparatus for cleaning air in a room defined by a floor, ceiling and two pairs of opposing side walls, said apparatus comprising:
a first columnar body extending between the floor and ceiling and arranged in contact with a first side wall of the room, a second columnar body extending between the floor and ceiling and arranged in contact with a second side wall of the room opposite to the first side wall, and a central columnar body located between said first and second columnar bodies and extending between the floor and ceiling, each of said columnar bodies defining an elongated vertical duct having an upper air outlet arranged adjacent the ceiling and a lower air inlet port;
an air circulating blower means in each of said columnar bodies for drawing air into said air inlet port and directing air towards said air outlet;
a horizontal duct fluidly communicating with said first, second and central columnar bodies, said horizontal duct including a first portion located between said first columnar body and said central columnar body and having opposite ends each communicating with the air outlet of the vertical duct of each of the first and central columnar bodies, and a second portion extending between the second and central columnar bodies and having opposite ends each communicating with the air outlet of the vertical duct of each of said second and central columnar bodies, said first and second portions of said horizontal duct extending completely across said room between the first and second side walls, each portion of said horizontal duct being defined by an upper face contacting said ceiling, a lower face spaced from and below said upper face, and two side faces each extending between said upper and lower faces, said lower face and at least one side face of each portion of said horizontal duct having clean air diffuser exits formed substantially over the entire surface of said at least one side face and lower face for the entire length thereof, to uniformly diffuse clean air across the room; and
an air cleaning dust collector arranged between said blower means in each of said columnar bodies and said diffuser exits in said first and second portions of said horizontal duct.

14. The apparatus of claim 13, wherein the air inlet port of each columnar body is spaced from and faces the floor.

15. An air cleaning system for cleaning air in a room defined by a floor, ceiling and two pairs of opposing side walls, said system comprising:
three air cleaning apparatus, a first air cleaning apparatus located adjacent a first side wall, a second air cleaning apparatus located adjacent a second side wall opposite said first side wall, and a third air cleaning apparatus located centrally between said first and second air cleaning apparatus, each air cleaning apparatus comprising:
- a columnar body extending between the floor and ceiling and arranged in contact with a third side wall perpendicular to said first and second side walls, said columnar bodies defining an elongated vertical duct having an upper air outlet arranged adjacent the ceiling and a lower air inlet port;
- an air circulating blower means for drawing air into said air inlet port and directing air towards said air outlet;
- a horizontal duct supported by said columnar body and communicating with the air outlet of said vertical duct, said horizontal duct extending completely across said room between the third side wall and a fourth side wall opposite said third side wall, said horizontal duct being defined by an upper face contacting said ceiling, a lower face spaced from and below said upper face, and two side faces each extending between said upper and lower faces, said lower face and one side face of said first and second air cleaning apparatus having clean air diffuser exits formed substantially over the entire surface of the side and lower faces for the entire length thereof to uniformly diffuse clean air across the room, the remaining side face of said horizontal duct in said first and second air cleaning apparatus contacting said first and second side walls, respectively,
- said lower face and both side faces of said central air cleaning apparatus having clean air diffuser exits formed substantially over the entire surface of both side faces and lower face for the entire length thereof between said third and fourth side walls to uniformly diffuse clean air across the room; and
- an air cleaning dust collector arranged in each of said air cleaning apparatus between said blower means and said diffuser exits.

16. The system of claim 15, wherein said inlet port in each columnar body is spaced from and faces said floor.

* * * * *